United States Patent
Kiemle

[11] 3,802,762
[45] Apr. 9, 1974

[54] COHERENT OPTICAL MULTICHANNEL CORRELATOR

[75] Inventor: Horst Kiemle, Munich, Germany

[73] Assignee: Siemens Aktiengesellschaft, Berlin & Munich, Germany

[22] Filed: May 1, 1972

[21] Appl. No.: 249,127

[30] Foreign Application Priority Data
May 25, 1971 Germany............................ 2125889

[52] U.S. Cl............................. 350/162 SF, 356/71
[51] Int. Cl. .................................................. G02b 5/18
[58] Field of Search ................. 350/162 SF; 356/71

[56] References Cited
UNITED STATES PATENTS
| | | | |
|---|---|---|---|
| 3,597,069 | 8/1971 | Heinonen, Jr. ................. | 350/162 X |
| 3,675,983 | 7/1972 | La Macchia .................... | 350/162 X |
| 3,248,552 | 4/1966 | Bryan ............................ | 356/71 X |

*Primary Examiner*—William F. Lindquist
*Attorney, Agent, or Firm*—Hill, Sherman, Meroni, Gross & Simpson

[57] ABSTRACT

A coherent optical multichannel correlator for identifying an object to be investigated by permeating the object with a beam of coherent radiation which is received by a transformation element and projected on a filter hologram which reconstructs a reference wave received by an optical sensor when the object to be identified is correlated with a filter hologram characterized by a Fourier transformation element comprising a plurality of lenses arranged in a raster with each lens having a focal point separated from a focal point of adjacent lenses, and by the filter hologram comprising a plurality of filter holograms with each of the plurality of filter holograms associated with a separate lens of the raster. The raster of lenses may be a raster of Fresnel zone lenses. The optical sensing element may be a single element which receives the reconstructed waves from each of the filter holograms or it may be subdivided into a plurality of sensing elements with each of the elements associated to receive the reconstructed reference wave of a single hologram filter. The lenses of the raster may be arranged with the focal point of each of the lenses lying in a single plane extending vertically to the optical axis of the beam or can be arranged with the focal points lying in a plurality of different parallel planes which extend vertical to the optical axis and preferably the filter holograms are located at the focal point for its respective lens.

10 Claims, 1 Drawing Figure

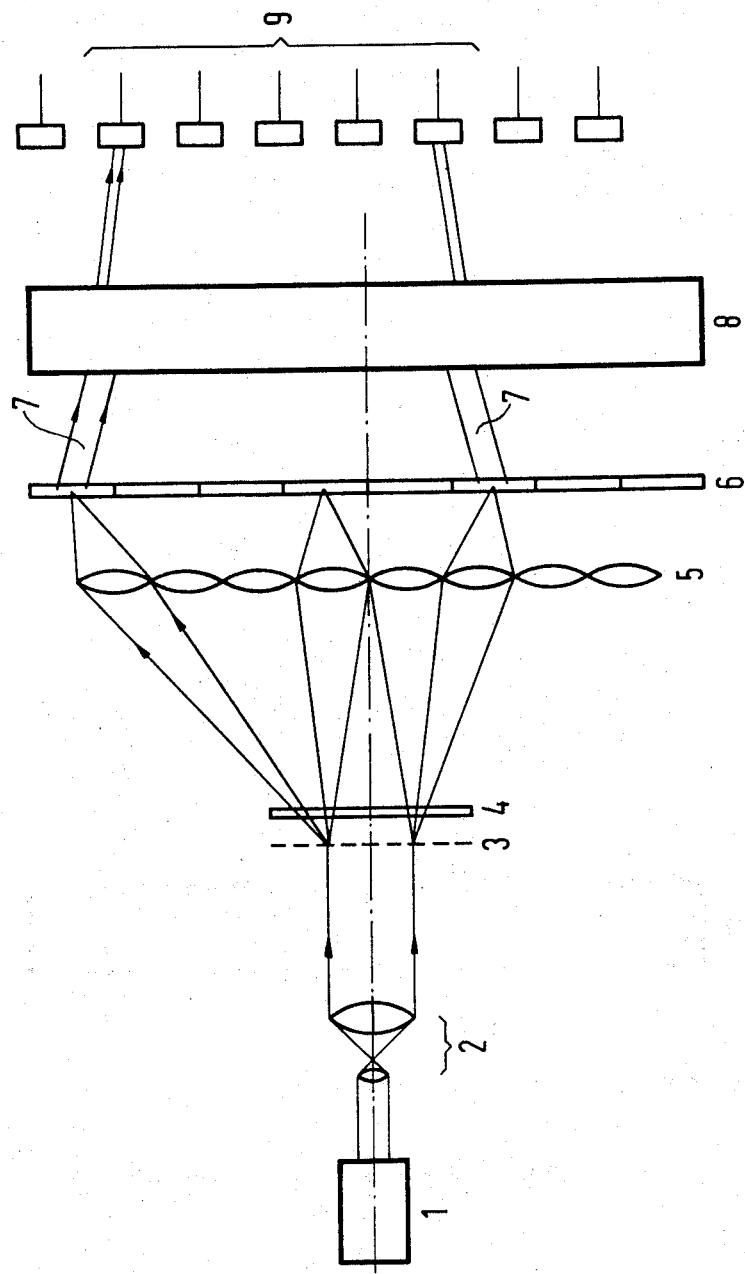

COHERENT OPTICAL MULTICHANNEL CORRELATOR

BACKGROUND OF THE INVENTION

1. Field of the Invention

The present invention is directed to a coherent optical multichannel correlator utilizing a plurality of filter holograms during investigation of an object.

2. Prior Art

Coherent optical correlation has been suggested for the detection and identification of alpha numerical signs or symbols, finger prints, geometric figures and aerial photographs. This is accomplished by the symbol or figure which is to be identified, being transformed into a position function, which is described as light transmission distributions, for instance, as diapositive. The object to be identified is radiated by coherent light and the permeating light distribution produces an object wave which is projected on a so-called filter hologram which contains a stored comparison object wave. If the object wave projected onto the filter hologram is identical to the object wave used in forming the filter hologram, a reference wave of the filter hologram is reconstructed and is sensed by an optical sensor to produce a signal which can be further processed in the identification process.

A precondition for such a correlation system is that the object which is to be detected, has the same areal orientation or the same orientation in a two-dimensional plane as the orientation of the object used to produce the filter hologram.

In order to make a correlation analysis possible of an object or symbol to be identified, regardless of parallel shifting of the object or symbol of the object or symbol in the illuminating beam, the light distribution coming from the illuminated object or symbol is subject to a Fourier transformation. A Fourier transformation can be realized, for instance, by focusing of the object wave from the object or symbol by means of a collective lens. If, thereby, the object is located in one focal plane of the lens, the amplitude and phase-correct Fourier spectrum of the object wave will be received in the other focal plane and is compared with a known object wave of a filter hologram which was produced with a Fourier spectrum of the known object wave.

For technical applications, the orientation of the object to be identified with the orientation of the recorded known object wave forming the filter hologram must coincide to enable correlation procedures for identifying objects to be carried out at a high speed. Variations in the orientation of the object to be identified with respect to the orientation of the object wave recorded on the filter hologram, variations in the scale or size between the object to be identified and the recorded known object, or variations in the object itself such as slight differences in the shape of the letter or symbol to be identified will reduce the speed of the correlation procedure or the preciseness of the identification of the object or symbol.

To overcome the problems regarding variations in the orientation of the object to be investigated, differences in the size of the object to be investigated with regard to the size of the object recorded on the filter hologram and a slight variation in the shape of the object, it has been suggested to utilize a hologram filter having recorded thereon a multitude of equal but areal-wise divided image points, which points correspond image points created by illuminating or radiating the known object to be investigated. While such a hologram filter eliminates some of the above-mentioned problems, the production of the filter hologram requires considerable effort and expense.

SUMMARY OF THE INVENTION

The present invention is directed to a coherent optical multichannel correlator for comparing an object or symbol with a known object which correlator is capable of handling an object or symbol to be identified without time-consuming adjustments to correct for either variations in orientation of the object or symbol or variations in shape or size of the object or symbol being investigated. The device utilizes a plurality of filter holograms and a coherent light beam such as produced by a laser to permeate the object or symbol that is being identified which light, after permeation of the object, is received by a Fourier transformation element having a plurality of lenses arranged in raster. Each of the lenses of the raster focus the image at a separate focal point and each of the filter holograms is located at the focal point for the respective lens to enable a comparison of the object to be identified with the object recorded on the filter hologram. If a correlation of the object to be identified with one of the filter holograms occurs, a reconstructed reference beam is formed and received by a light-sensing device to create an electrical signal for further processing. The light-sensing device may be either a single unit for all of the filter holograms to enable identification of the symbol or object regardless of size, shape or orientation, or a plurality of individual units with each unit associated with a separate filter hologram to identify the object and its particular shape, size or orientation. The raster of lenses can be a raster of Fresnel zone lenses or a raster of collective lenses. The plurality of filter holograms are preferably at the focal point of its associated lens and the focal points of the lenses of the raster may lie in a single plane extending vertically or perpendicular to the optical axis of the coherent light beam or lie in different planes which extend vertically or perpendicular to the optical axis.

DESCRIPTION OF THE DRAWING

The FIGURE schematically illustrates a coherent optical multichannel correlator according to the present invention.

DESCRIPTION OF THE PREFERRED EMBODIMENTS

The principles of the present invention are particularly useful in a coherent optical multichannel correlator illustrated in the FIGURE. The correlator utilizes a beam of coherent monochromatic light emitted by a suitable source such as laser 1 as a plane wave, a carrier 4 to support the object or symbol to be identified, a Fourier transformation element comprising a raster 5 of a plurality of lenses arranged in a pattern, a plurality of filter holograms 6 arranged in a raster or pattern corresponding to raster 5, and light or optical sensing means 9.

To provide a wider beam of light than the beam provided by the laser 1, the beam from the laser 1 is projected through a beam-widening means 2 which is illustrated as a pair of lenses to increase or expand the width of the beam. The widened or expanded beam is then projected through a diffraction grating 3 to create multiple illumination waves which are used to permeate or illuminate the symbol or object on the carrier 4 in such a manner that each lens of the raster 5 receives a single wave which has just permeated or illuminated the object that is to be identified. The carrier 4 is preferably located at the focal plane for the lenses of the raster 5.

Each of the lenses of the raster 5, which lenses may be collective lenses or Fresnel zone lenses, forms a separate spherical wave which has a focal point that is separated from the focal points of the other lenses of the raster 5. The flter holograms 6 which are arranged in a pattern corresponding to the pattern of the raster 5 are preferably positioned at the focal points of the lenses with each of the filter holograms 6 receiving the light projected from a single lens associated therewith.

When the object wave projected by the lens of the raster 5 on the filter hologram 6 coincides with the object wave used to record the filter hologram, correlation occurs and a reference wave 7 of the hologram filter 6 is reconstructed. The reconstructed reference wave 7 passes through an optical evaluation means or unit 8 onto the optical sensing means 9, such as a photo-diode, which converts an optical signal into an elctrical signal for further processing in a known manner in the identification process. Preferably the reference wave used in recording each of the filter holograms is a converging beam and each of the converging reference beams 7 for the raster of filter holograms can either converge on a single spot or extend substantially parallel to converge on a plurality of spaced spots arranged in a given pattern. The optical evaluation means or unit 8 may comprise a single lens, a plurality of lenses arranged in a raster, a hologram or other optical component for placing the reference waves 7 into suitable form, such as converting a non-converging reference beam into a converging beam or to change the amount of convergence for a converging beam, and for directing the reference beam 7 onto the optical sensing means 9.

The optical sensing means 9 may be a single photodiode which produces an electrical signal when correlation occurs regardless of shape, size or orientation of the object or symbol being investigated and preferably the beams of the reference wave 7 of all of the holograms converge on a single spot, or optical evaluation means 8 is provided with means to focus the parallel extending beams of the reference waves 7 on the single photodiode. If the optical sensing means 9 comprises a plurality of sensing elements arranged in a pattern as illustrated, and if each of the reference wave beams 7 is converging on a separate and spaced spot, then correlation between the object wave from the object or symbol to be identified and a particular filter hologram can provide both the identification or presence of the symbol or object and information as to its characteristic, such as areal orientation, size, shape or print style. Each of the individual reference waves with a parallel beam creates an independant two-dimensional parallel channel. When obtaining both identity and characteristics of the symbol or object being investigated, the individual sensing elements may be questioned in a conventional manner in a timewise or step-wise sequence to determine which element received the optical signal.

The correlator can utilize a raster 5 of lenses whose individual focal points lie in a single focal plane extending vertically to the optical axis of the beam from the laser 1. The pattern of filter holograms 6 is provided in this focal plane and as illustrated, the plane is perpendicular to the optical axis.

Another preferred embodiment of the correlator utilizes a raster 5 of lenses whose individual focal points lie in different planes which extend vertically to the optical axis and the filter hologram for each lens is positioned at the focal point of the respective lens. Thus, the filter holograms can be provided as a volume hologram.

The coherent optical multichannel correlator can be used to identify a symbol or object, which includes words, figures, finger prints and photos, by comparing the Fourier spectrum of the symbol with a hologram filter which records an object wave of a known symbol or object with each of the plurality of filter holograms recording the known symbol in either a different areal orientation, different size, or different shape such as printing or type style. If the object or symbols to be identified do not have variations in size, shape, style or orientation, or only a small number of variations, more than one filter hologram can be of the same known symbol with the same areal orientation, size, style and shape. When correlation between the object wave of the symbol or object to be identified and the filter hologram occurs, more than one filter hologram will reconstruct the reference wave to produce an improvement in the optical signal to noise ratio by a factor which equals the number ($n$) of channels being used which is the number of filter holograms which are in correlation. The amplitude and intensity of the reconstructed reference waves add up and the result is an optical signal being $N^2$ times bigger than the signal occurring during single channel operation when only one filter hologram is in correlation to produce one reference wave.

Although various minor modifications might be suggested by those versed in the art, I wish to incorporate within the scope of the patent granted hereon, all variations and modifications that reasonably come within my contribution to the art.

I claim:

1. A coherent optical multichannel correlator for identifying objects comprising means for projecting a beam of coherent light for permeating an object to be identified, a Fourier transformation element receiving the light beam after permeating the object being investigated, said element being a plurality of lenses arranged in a raster, a plurality of filter holograms being positioned to receive the light from the raster of lenses with each filter hologram being disposed to receive light from a single lens of the raster of lenses, and an optical sensing means arranged for receiving a reconstructed reference wave of the filter hologram.

2. A coherent optical multichannel correlator according to claim 1, wherein each of the lenses of the raster is a collective lens having a separate focal point and the focal points of the lenses of the raster lie in a single plane extending perpendicular to the optical axis of the beam.

3. A coherent optical multichannel correlator according to claim 1, wherein each of the lenses of the raster is a collective lens having a separate focal point and the focal points of the lenses of the raster lie in a plurality of planes extending perpendicular to the optical axis of the beam.

4. A coherent optical multichannel correlator according to claim 1, wherein each of the lenses of the raster have a separate focal point and the filter hologram associated with each of the lenses lies at the focal point of its respective lens.

5. A coherent optical multichannel correlator according to claim 1, wherein the optical sensor means comprises a single optical sensor receiving the reconstructed reference waves from all of the hologram filters.

6. A coherent optical multichannel correlator according to claim 1, wherein the optical sensing means comprises a plurality of optical sensors each being arranged to receive the reconstructed reference wave from a single hologram filter.

7. A coherent optical multichannel correlator according to claim 1, wherein the raster of lenses forming the Fourier transformation element is a raster of Fresnel zone lenses.

8. A coherent optical multichannel correlator according to claim 7, wherein each of the Fresnel zone lenses of the raster has a separate focal point and all of the focal points lie in a single plane extending perpendicular to the optical axis of the beam.

9. A coherent optical multichannel correlator according to claim 7, wherein each of the Fresnel zone lenses of the raster has a separate focal point and the focal points of the lenses of the raster lie in a plurality of planes extending perpendicular to the optical axis of the beam.

10. A coherent optical multichannel correlator according to claim 1, wherein each of the lenses of the raster of lenses has a separate focal point and the focal points of the lenses lie in parallel planes extending perpendicular to the optical axis of the beam, and wherein each of the filter holograms is arranged at the focal point of its respective lens.

* * * * *